US009480039B2

(12) United States Patent
Kasravi

(10) Patent No.: US 9,480,039 B2
(45) Date of Patent: Oct. 25, 2016

(54) SYSTEM AND METHOD FOR VIRTUAL REPLICATION OF A MOBILE PHONE

(75) Inventor: Kas Kasravi, W. Bloomfield, MI (US)

(73) Assignee: Hewlett Pakard Enterprise Development LP, Houston, TX (US)

( * ) Notice: Subject to any disclaimer, the term of this patent is extended or adjusted under 35 U.S.C. 154(b) by 13 days.

(21) Appl. No.: 14/400,601

(22) PCT Filed: Jun. 30, 2012

(86) PCT No.: PCT/US2012/045149
§ 371 (c)(1),
(2), (4) Date: Nov. 12, 2014

(87) PCT Pub. No.: WO2014/003797
PCT Pub. Date: Jan. 3, 2014

(65) Prior Publication Data
US 2015/0099515 A1 Apr. 9, 2015

(51) Int. Cl.
H04W 60/00 (2009.01)
H04W 8/30 (2009.01)
H04W 12/12 (2009.01)
H04W 88/02 (2009.01)

(52) U.S. Cl.
CPC ............ H04W 60/00 (2013.01); H04W 8/30 (2013.01); H04W 12/12 (2013.01); H04W 88/02 (2013.01)

(58) Field of Classification Search
CPC ...... H04W 60/00; H04W 12/12; G06F 21/00
See application file for complete search history.

(56) References Cited

U.S. PATENT DOCUMENTS

| 2006/0285663 | A1 | 12/2006 | Rathus et al. |
| 2007/0021112 | A1 | 1/2007 | Byrne et al. |
| 2009/0041230 | A1 | 2/2009 | Williams |
| 2009/0203403 | A1 | 8/2009 | Gidron et al. |
| 2012/0233663 | A1* | 9/2012 | Ortiz .................. H04L 63/0272 726/4 |

FOREIGN PATENT DOCUMENTS

| JP | 2002344665 | 11/2002 |
| JP | 2004517536 | 6/2004 |
| JP | 2011142604 | * 7/2011 ............. G06F 21/00 |

OTHER PUBLICATIONS

"Bobsled"; http://bobsled.com/#!/features: 3 pages. Features. Anywhere.

(Continued)

Primary Examiner — Myron K Wyche
(74) Attorney, Agent, or Firm — Hewlett Packard Enterprise Patent Department

(57) ABSTRACT

Embodiments of the present invention disclose a system and method for virtual replication a mobile phone device. According to one example embodiment, a user of the mobile device registers with a virtual host server configured to communicate with a telecommunication service provider. A communication identifier associated with the mobile device is transferred to the virtual host server. Furthermore, user phone data collected by the virtual host server from a virtual mobile phone application running on the mobile phone device. In addition, telephonic communication and date access functionality afforded by the mobile phone is capable of being replicated on an auxiliary computing device using the communication identifier and personal data generated by the virtual host server.

15 Claims, 5 Drawing Sheets

(56) References Cited

OTHER PUBLICATIONS

"Notification of Transmittal of the International Search Report and the Written Opinion of the International Searching Authority, or the Declaration"; cited in PCT/US2012/045149; mailed Feb. 27, 2013; 9 pages.

Rehman, A.; "Android Allows Remote Access & Control of Android Over Wi-fi via Web Browser"; Nov. 28, 2011; 15 pages.

Extended European Search Report received in EP Application No. 12880133.9, Feb. 2, 2016, 16 pages.

International Preliminary Report on Patentability received in PCT Application No. PCT/US2012/045149, Jan. 8, 2015, 6 pages.

\* cited by examiner

SYSTEM AND METHOD FOR VIRTUAL REPLICATION OF A MOBILE PHONE

BACKGROUND

Mobile phone communication—facilitated through use of cell phones and smartphone devices—has become ubiquitous in today's society. Many users have become reliant on their mobile communication device as the primary source for management of user data including contacts, calendar, tasks, media, and text messages. Consequently, the mobile phone is often considered the hub of personal information for countless users. Misplacing or losing one's mobile phone is often a traumatic experience due to the inability to place phone calls, in addition to the inaccessibility and possible loss of personal information stored on the mobile device. In some cases, the mobile phone may be intentionally left behind or forgotten, leading to the same unpleasant outcomes.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
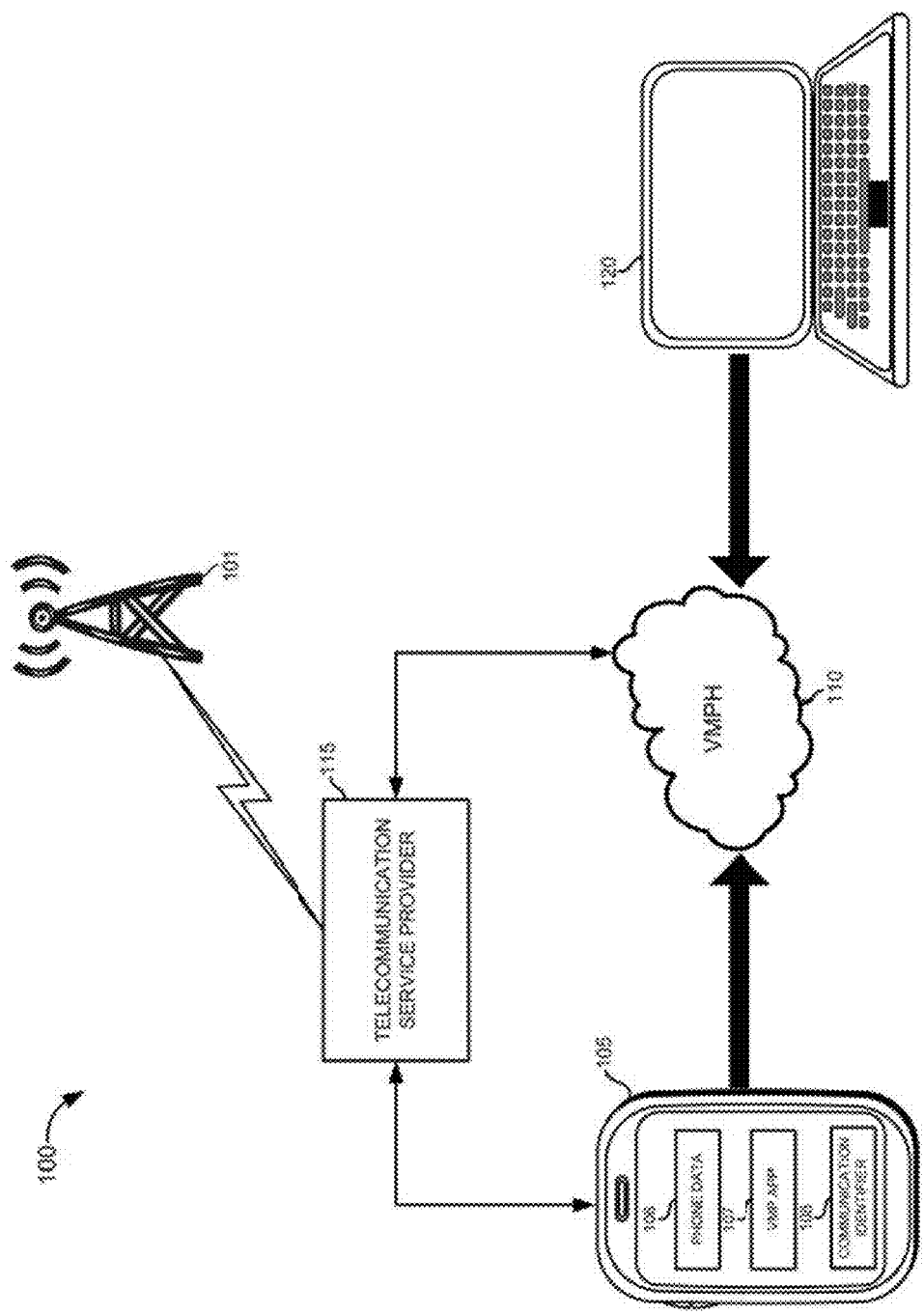
FIG. 1 is a generalized schematic and conceptual diagram of a system for virtual replication of a mobile phone device according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Because mobile phones are integral to the storage and management for personal information, user's often face unfortunate challenges in the event of a lost or misplaced phone. There have been several attempted solutions to the aforementioned problem. Some prior solutions provide internet-based communications services. However, these systems simply provide an alternative to an existing mobile phone rather than an exact or virtual copy of the mobile device and associated functionality. That is, existing internet-based solutions are aimed at parallel use with a user's mobile device and do not provide the necessary functionality and/or stored information in the event at a user misplacing the device. Other solutions provide a service for remotely controlling a personal mobile device. A remote control service, however, still fails to provide the two-way communication afforded by mobile phone devices.

Some solutions enable a user to manually create duplicate portions of their phone content in one or more locations, which may not be practical. Though contact, calendar, and tasks items may be stored on third-party web-based applications, other personal information such as text messages, phone records, applications and phone settings are not easily stored based on known technologies. Moreover, duplicating the content and functionality of a mobile phone, in a manner that can be readily accessed by a user is not easy, obvious, or possible with current solutions. As such, there is a need in the art for a system and method that provides true replication of virtual mobile phone functionality without physical access to the mobile phone.

Examples of the present invention provide a system and method that replicates the functionality of a missing mobile phone via a browser on any internet connected computer. According to one example, the system includes any application installed on the mobile phone that securely uploads all of the mobile phone data, apps, and settings to a virtual mobile phone host (e.g., cloud-based server). The virtual mobile phone host (VMPH) has the ability to communicate with telephone companies via an internet telephony gateway. Furthermore, a browser interface associated with a surrogate computing device serves as an auxiliary access vehicle to the mobile phone's features, data, applications, and the like including the ability to make or receive a phone call via the computing device and web-based interface.

Referring now in more detail to the drawings in which like numerals identify corresponding parts throughout the views, FIG. 1 is a generalized schematic and conceptual diagram of a system for virtual replication of a mobile phone device according to an example of the present invention. As shown here, examples of the present invention include a wireless communication tower 101, a mobile phone device 105, a virtual mobile phone host server 110, a telecommunication service provider 115, and a surrogate computing device 120. As will be explained in further detail below with reference to FIG. 2, the virtual mobile phone host (VMPH) 110 includes software components, cloud infrastructure, and service to support telecommunication capabilities for registered clients/users and/or devices. According to one example, mobile phone 105 represents a cellular phone or mobile telecommunication device having a unique communication identifier 108, a virtual mobile application 107 and personalized phone data 106 such as a contacts, calendar, tasks, text messaging, etc. Service provider 115 is a telecommunication company or entity that provides for communication services and assigns a unique communication identifier (e.g., phone number) to a mobile phone device. The surrogate computing device 120 represents a network enabled computing device including a desktop computer, laptop computing device, tablet computing device, or smartphone for example.

Figure 2:
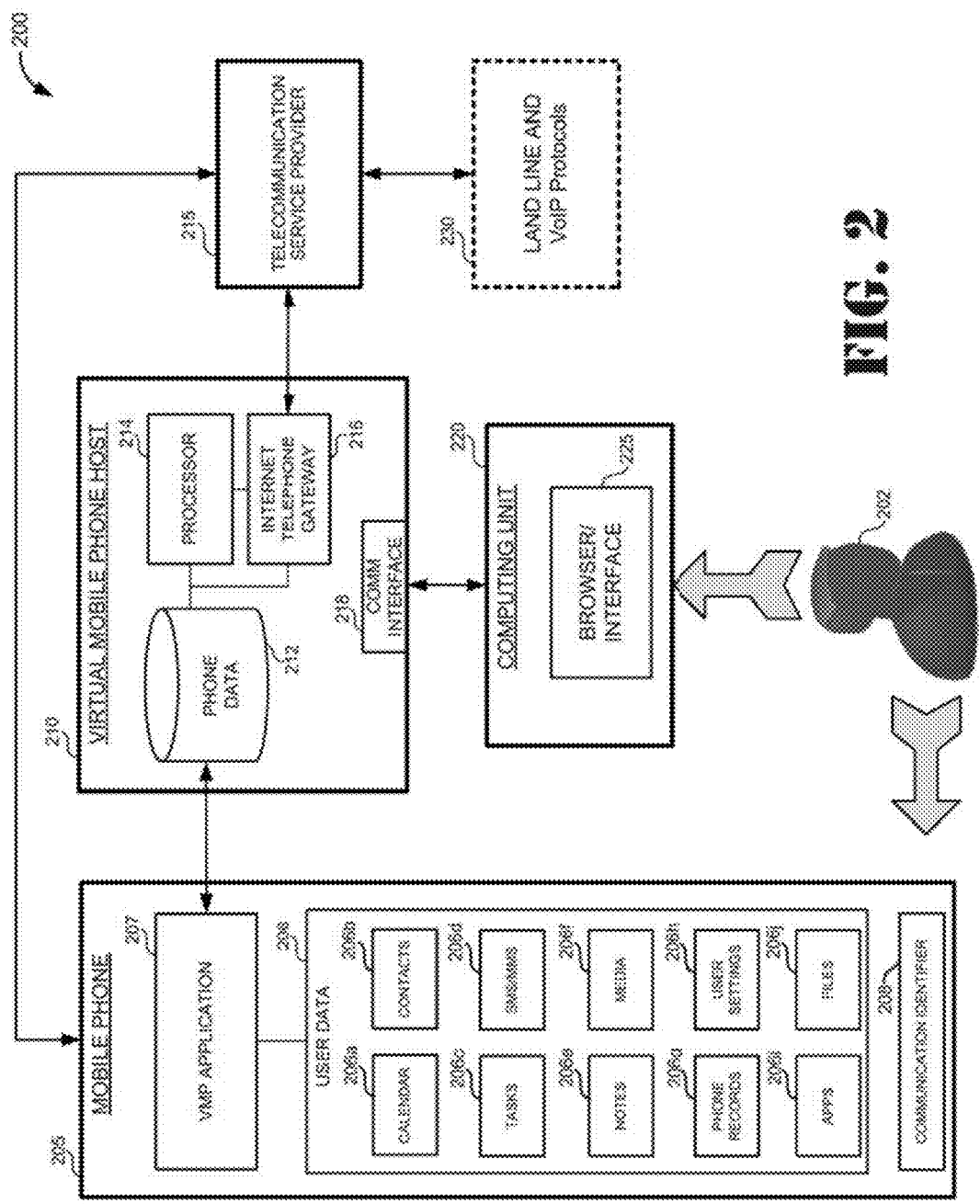
FIG. 2 is a simplified block diagram of a system for virtual replication of a mobile phone according to an example of the present invention.

FIG. 2 is a simplified block diagram of a system for virtual replication of a mobile phone according to an example of the present invention. As shown, the virtual mobile phone replication system 200 includes a mobile phone device 205, a virtual mobile phone host 210, a telecommunication service provider 215, a surrogate computing unit 220, and landline and IP networking protocols 230. The mobile phone device 200 includes user data 206, virtual mobile phone application 207, and a communication identifier 208. The personal phone data 206 of the mobile phone is associated with an operating user 202 and includes, but is not limited to: contacts, calendar data 206a, contacts 206b, task items 206c, short messaging service (SMS)/multimedia message service (MMS) messages 206d, notes 206e, media (pictures/video/music) 206f, phone records/call history 206g, user phone settings 206h, applications 206f, and files 206j. According to one example embodiment, the virtual mobile phone application 207 represents a software application configured to read personal data 206 of the mobile phone (e.g., contact, call history, etc.) and securely transfer the data 206 to the VMPH 210. The communication identifier 208 represents a unique number associated with the mobile phone device such as a mobile phone number issued by the telecommunication service provider 215 for example.

According to one example, the VMPH 210 represents a cloud-based infrastructure and service comprising of a database 212 for storing the mobile phone data, a processing unit 214, an internet telephony gateway 216, and a communication interface 218. Processor 214 represents a central processing unit (CPU), microcontroller, microprocessor, or logic configured to execute programming instructions associated with the VMPH 210. The communicator interface 218 represents a HTML/XML or similar interface for facilitating network access from the surrogate computing device 220. The internet telephony gateway 218 allows for bi-directionally communication between the VMPH 210 and service provider 215, which represents a telecommunication service company configured to provide wireless telecommunication services to clients/mobile devices. Service provider 215 may be associated with broadband and telecommunication companies that provide landline and/or VoIP communication/networking services. Examples of the present invention thus enable the VMPH 210 and surrogate computing device 220 to place and receive phone calls using landline/VoIP protocols 230.

The surrogate computing device 220 is operated by a registered user 202 and represents a networked computer having a browser or web-based interface 225. Additionally, the computing device 220 is configured to communicate bi-directionally with the VMPH 210 via the browser interface 225 and communication interface 218 of the VMPH 210. Furthermore, the web-based interface 225 which runs on the surrogate computing device 220, is capable of utilizing the phone data stored on the VMPH database 212 to simulate the mobile phone 205 by providing for: access to contacts, calendar items and other data associated with the mobile device 205, emulation of applications, playback of music and video, and display of pictures associated with mobile device 205 for example. In addition, the imported communication identifier of the mobile device may be utilized for remote telecommunication including the ability to make and receive phone calls using the same communication identifier associated with the mobile phone. Thus, a registered user 202, who normally operates the mobile phone device 205, can now replicate all or substantially all functionality, including data and media access, provided by the mobile phone through the browser and web-based interface 225. And in the case of a misplaced or lost mobile phone 205 for example, telecommunication services—using the mobile phone communication identifier 208—may still be accomplished via the VMPH 210 and surrogate computing device 220.

Generally, when the mobile phone 205 is available and operated by a user, the mobile phone 205 communicates directly with the telecommunication service provider 215 in a normal or first operating mode. In accordance with one example, communication between the mobile phone device 205 and the VMPH 210 becomes active when the mobile phone device 205 is not available to the user. In such a scenario, the user may utilize the browser 225 of the surrogate computing unit 220 to signal for the VMPH to activate communication services on the surrogate computing unit 220 and to also make the latest version of the phone's user content available to SP 215 and browser 225. The primary communication identifier (i.e., mobile phone number) may be switched from the mobile phone 205 to VMPH 210 and/or the temporary surrogate device 220 via call forwarding such that costs associated with service fees can be directed back to the user's account with the SP 215. Moreover, the telecommunication service provider 215 may bill users of the VMPH based on various billing models such as usage-based or flat fee (service insurance option) models for example.

In accordance with one example embodiment, a registered user may misplace mobile phone 205 (i.e., device unavailable) and desire to switch from the normal operating mode to a secondary operating mode using browser 225 of the surrogate computing device 220. When the VMPH 210 receives a change request from the user (e.g., via browser 225) to switch to the secondary operating mode, the VMPH 210 may communicate the change to the telephone service provider 215 in order to assign a secondary communication identifier (i.e., temporary phone number) to the registered user 202. Thereafter, future telephonic calls to primary communication identifier are automatically forwarded to the secondary communication identifier end retrieved by the user via browser 225. That is, the user may make and receive phone calls and SMS/MMS messages (i.e., telecommunication functionality), via VoIP 230 and browser 225, using the secondary communication identifier (although transparent to the user). The user 202 may also access all of the personal user data via the browser 225 including calendar items 206a and media 206f for example that was synched with the phone data database 212 (i.e., data access functionality). Providing both telecommunication and data access functionality through the VMPH 210 and browser 225 thus enables virtual replication of the mobile device 205 on the surrogate compiling device 215. Upon recovery or replacement of the mobile phone 205, the user 202 may communicate with the VMPH 210 via browser 225 to switch telecommunication services back to the normal operating mode (i.e., mobile phone 205 communicates directly with service provider 215).

Figure 3:
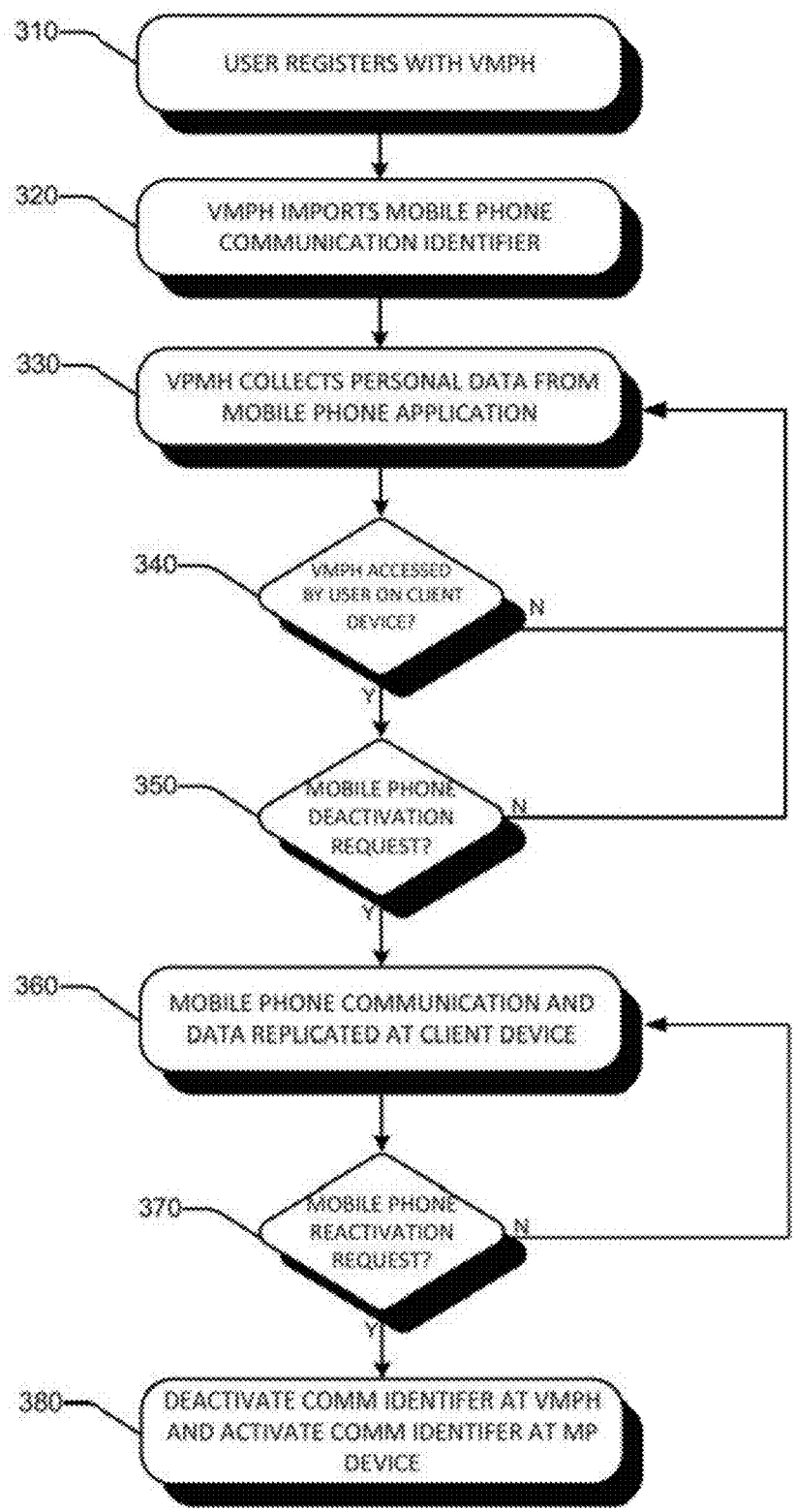
FIG. 3 is a simplified flow chart of the steps for providing virtual replication of a mobile phone according to an example of the present invention.

FIG. 3 is a simplified flow chart of the steps for providing virtual replication of a mobile phone according to an example of the present invention. In step 310, a user operating the mobile device registers with the virtual mobile phone host so as to create registration credentials. Next, in step 320, the VMPH imports the communication identifier or phone number of the mobile device and also collects user phone data from the mobile phone in step 330. As described above, a virtual mobile phone application running on the morale device is used to facilitate the transfer of the user data from the mobile phone to the VMPH. The data transfer process may occur continuously and in real-time such that the VMPH includes the most correct user phone data. According to one example embodiment, after the initial upload of all the user data, the processing unit of the VMPH may communicate with the VMP application of the mobile device periodically to detect changes made to user data such that updates to the phone data are only made based on detected changes, thereby reducing bandwidth consumption and data transfer costs. Upon determining, in step 340, that the registered user has accessed the VMPH on a surrogate computing device, and/or that mobile phone communication is temporarily disabled in step 350 (i.e., phone deactivation events), mobile phone communication and user data are replicated at the surrogate computing device in step 380. If, in step 370, the registered user desires to reactivate the mobile phone device, then in step 380, the telephone service provider facilitates deactivation of communication identifier at the virtual mobile phone host and reactivation of the communication identifier at the mobile phone device in step 380.

Figure 4:
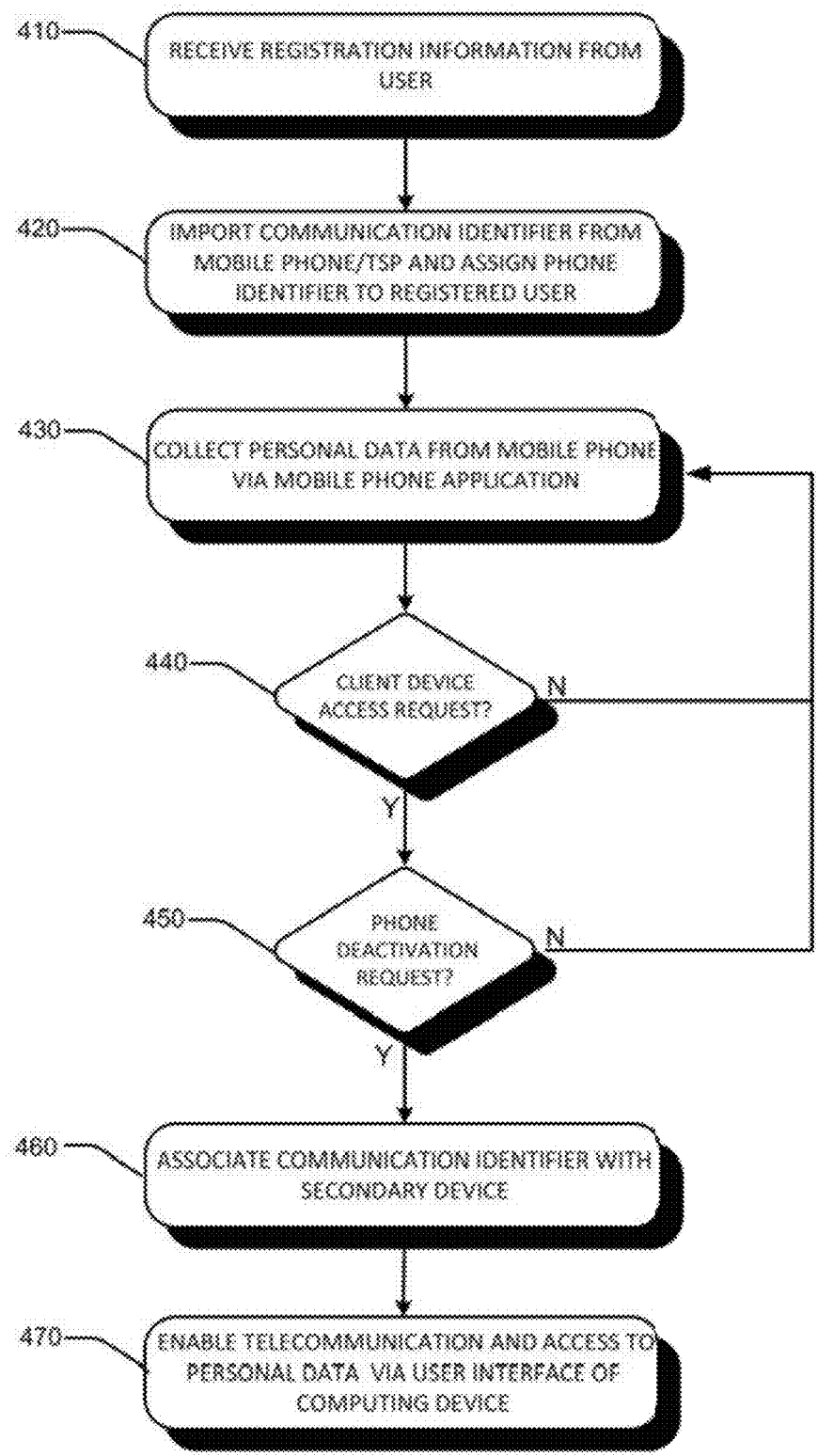
FIG. 4 is a simplified flow chart of the processing steps affiliated with the virtual mobile phone host in providing virtual replication of a mobile phone according to an example of the present invention.

FIG. 4 is a simplified flow chart of the processing steps affiliated with the virtual mobile phone host in providing virtual replication of a mobile phone according to an example of the present invention. In step 410, the virtual mobile phone test receives registration information from a user operating the mobile device. Thereafter, in step 420, the VMPH communicates with the mobile phone and telecommunication service provider to import or transfer the communication identifier associated with the mobile phone. To this end, the VMPH may associate and assign a device identifier with/to the communication identifier of mobile phone device. The device identifier may be analyzed during subsequent user access requests in order to determine if the user is operating a device other than the mobile phone device (e.g., surrogate computing device). Next, in step 430, the VMPH collects user phone data via the virtual mobile phone application installed on the mobile phone device as described above.

The event of misplaced mobile phone, examples of the present invention enable a client or operating user to then utilize a surrogate computing device for telecommunication services. More particularly, the processing unit of the VMPH is configured to detect a request for access from a surrogate computing device in step 440. If the user misplaces or loses the mobile phone device and elects to temporarily deactivate telecommunication service for the mobile device in step 450, then the VMPH communicates with the service provider to provisionally activate and associate a communication identifier (e.g., primary or second identifier) of the mobile phone with the surrogate computing device in stop 460. For instance, the user may select a deactivation option (i.e., deactivation event) via the web-based interface for initiating the transfer of communication services (e.g., phone number migration) from the mobile device to the VMPH and surrogate computing device. In addition, the processing unit may analyze device identification information associated with the surrogate computing device, and based on a comparison match with the stored identifier for the mobile phone, determine that the access request is coming from the registered user while operating a device other than the mobile phone device so as to automatically initiate phone deactivation and transfer of communication services to the surrogate computing device (i.e., deactivation event). However, examples of the present invention are not limited thereto and may also allow for parallel communication services by the mobile phone and surrogate computing device. Next, in step 470, the VMPH enables telecommunication services and access to the user phone date at the surrogate computing device and web-based user interface.

Figure 5:
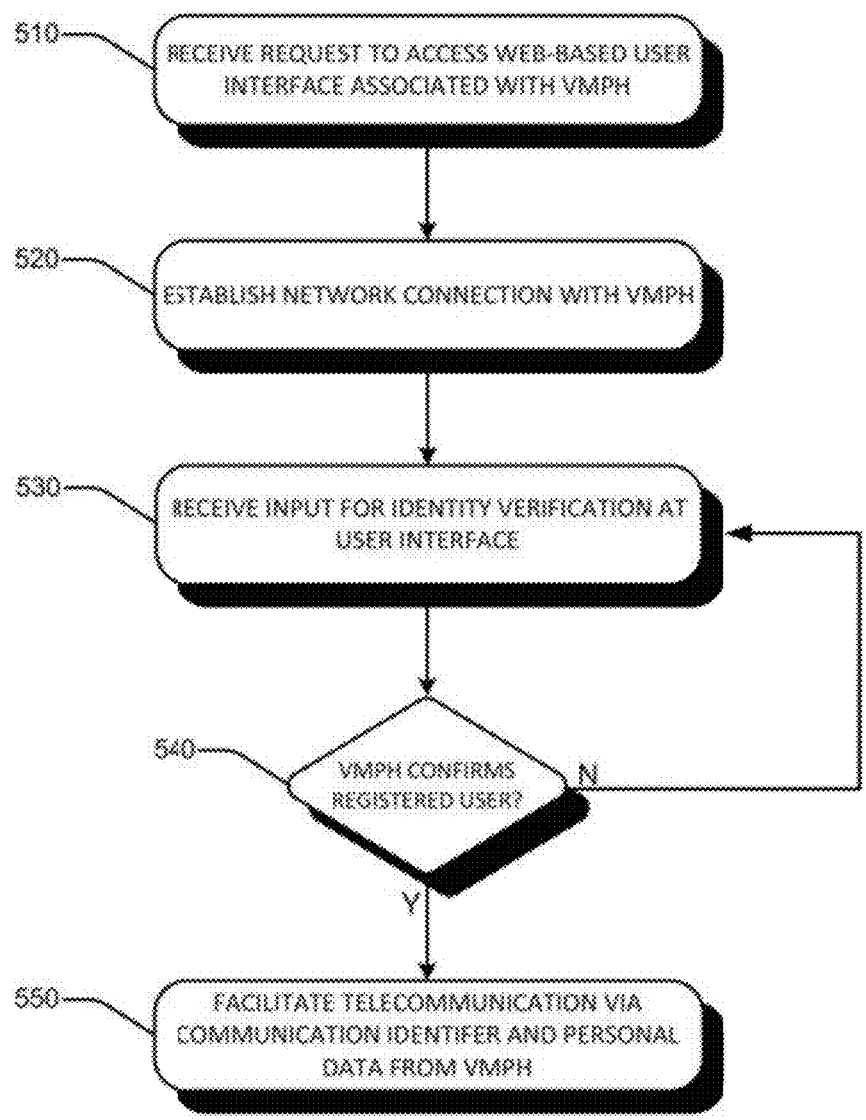
FIG. 5 is a simplified flow chart of the processing steps affiliated with the surrogate computing device in providing virtual replication of a mobile phone according to an example of the present invention.

FIG. 5 is a simplified flow chart of the processing steps affiliated with the surrogate computing device in providing virtual replication of a mobile phone according to an example of the present invention. In step 510, the surrogate computing device receives a request to access the web-based user interface associated with the virtual mobile phone host. Next, the computing device establishes a network connection with the VMPH in step 520. As mentioned above, the connection may be established through communication with an HTML/XML or similar interface protocol of the VMPH. Thereafter, in step 530, the computing device receives user input (i.e., registration credentials) for identify verification via the web-based user interface. Upon the VMPH confirming the user as a registered user in step 540, the computing device is then configured to facilitate telecommunication between one or more parties using the communication identifier and personal data generated from the virtual mobile phone host server in step 550.

Embodiments of the present invention provide a system and method for duplicating the functionality of a mobile phone device. Many advantages are afforded by virtual phone replication system in accordance with examples of the present invention. For instance, registered users of the VMPH are no longer concerned about misplacing or losing their mobile phone as they can readily access content and functionality of their mobile phone via any internet-connected browser. Additionally, examples of the present invention enable for simple and efficient transfer and access to media and software applications using the virtual mobile phone host server. Through provisional rendering of telephonic communication and data access functionality associated with a user's mobile device by the VMPH, examples of the present invention thus enable virtual replication of the mobile device on an auxiliary or surrogate computing devices.

Furthermore, while the invention has been described with respect to exemplary embodiments, one skilled in the art will recognize that numerous modifications are possible. For example, although exemplary embodiments depict a notebook computer as the surrogate computing device, the invention is not limited thereto. For example, the surrogate or auxiliary computing a device may be a network, a tablet personal computer, a smartphone, or any other computing device have network access and configured to communicate with the virtual mobile phone host. Thus, although the invention has soon described with respect to exemplary embodiments, it will be appreciated that the invention is intended to cover all modifications and equivalents within the scope of the following claims.

What is claimed is:

1. A method for replicating a mobile phone having a communication identifier, the method comprising:
   registering the mobile phone at a virtual host server configured to communicate with a telecommunication service provider;
   importing, by the virtual host server, the communication identifier of the mobile phone via the telecommunication service provider;
   collecting, via the virtual host server, user phone data from a virtual mobile phone application running on the mobile phone, the user phone data including a user application installed on the mobile phone; and
   replicating, on a computing device via the virtual host server, telecommunication functionality and data access functionality of the mobile phone using the communication identifier and the collected user phone data, the replicated data access functionality including emulation of the user application.

2. The method of claim 1, further comprising:
   detecting, via the virtual host server, a deactivation event associated with the mobile phone; and
   provisionally deactivating telecommunication services for the mobile phone.

3. The method of claim 2, further comprising:
   communicating, via the virtual host server, with the telecommunication service provider to activate the communication identifier on the virtual host server;
   facilitating, by the virtual host server, telecommunication on the computing device using the communication identifier, via communication between the computing device and the virtual host server and via communication between the virtual host server and the telecommunication service provider.

4. The method of claim 2, further comprising:
   receiving a request for access to the virtual host server via a web-based interface of the computing device;
   establishing, in response to the request, a connection between the virtual host server and the computing device; and
   verifying, via the host server, registration credentials of the user operating the computing device,
   wherein the replicating is in response to successful verification of the registration credentials by the virtual host server.

5. The method of claim 3, further comprising:
   receiving, at the virtual host server via a browser of the computing device, a user request to reactivate the mobile phone; and
   communicating, via the host server, with the telecommunication service provider to deactivate the communication identifier at the virtual host server and reactivate the communication identifier on the mobile phone device.

6. The method of claim 1, wherein the personal data includes contacts, calendar data, contacts, task items, text messages, media, call history, applications, and/or user phone settings.

7. The method of claim 1, wherein the communication identifier is a unique phone number used for telecommunication between two or more parties.

8. A system for virtual replication of a mobile phone of a user, the mobile phone having a primary communication identifier, the system comprising:
   a data storage;
   a virtual host server processor to:
      request a telecommunication service provider to transfer the primary communication identifier of the mobile phone and assign the primary communication identifier associated with the user to the virtual host server processor,
      receive personal data from a virtual mobile phone application installed on the mobile phone, wherein the personal data is associated with the user and stored on the mobile phone, and the personal data includes user applications installed on the mobile phone,
      store received personal data in the data storage,
      replicate, on a computing device via a communication interface between the virtual host server processor and the computing device, telecommunication functionality and data access functionality of the mobile phone based on the primary communication identifier and the personal data, and
      emulate at least one of the user applications received as personal data.

9. The system of claim 8, wherein upon the virtual host server processor detecting a deactivation event associated with the mobile phone and initiated by the user, the virtual host server processor is to communicate with the telecommunication service provider to provisionally deactivate telecommunication services on the mobile phone.

10. The system of claim 9, wherein upon the virtual host server processor detecting the deactivation event, the virtual host server processor is to communicate with the telecommunication server provider to assign a secondary communication identifier to the computing device, and
   telecommunications directed to the primary communication identifier are forwarded to the computing device via the secondary communication identifier.

11. The system of claim 10, wherein the virtual host server processor establishes a connection with the computing device based upon receipt of a user request for access to replicated telephonic communication and data access functionality; and
   wherein telephonic communication functionality of the mobile phone is automatically replicated at the computing device based upon verification of user registration credentials by the virtual host server processor at the competing device.

12. The system of claim 11, wherein the virtual host server processor is to communicate with the telecommunication service provider to deactivate the secondary communication identifier on the computing device and reactivate the primary communicate identifier on the mobile phone device upon receiving a user request to reactivate the mobile phone.

13. The system of claim 8, wherein the personal data includes contacts, calendar data, contacts, task items, text messages, media, call history, and/or user phone settings.

14. The system of claim 8, wherein the primary communication identifier is a unique phone number used for telecommunication between two or more parties.

15. A non-transitory machine readable medium storing instructions executable by a processor of a virtual host server, the non-transitory machine readable medium comprising:
   instructions to register a mobile phone having a communication identifier;
   instructions to import the communication identifier of the mobile phone via a telecommunication service provider in communication with the virtual host server;

instructions to collect user phone data from a virtual mobile phone application running on the mobile phone, the user phone data including a user application installed on the mobile phone; and instructions to replicate, on a computing device in communication with the virtual host server, telecommunication functionality and data access functionality of the mobile phone using the communication identifier and the collected user phone data, wherein the replicated data access functionality includes emulation of the user application.

* * * * *